2,818,244

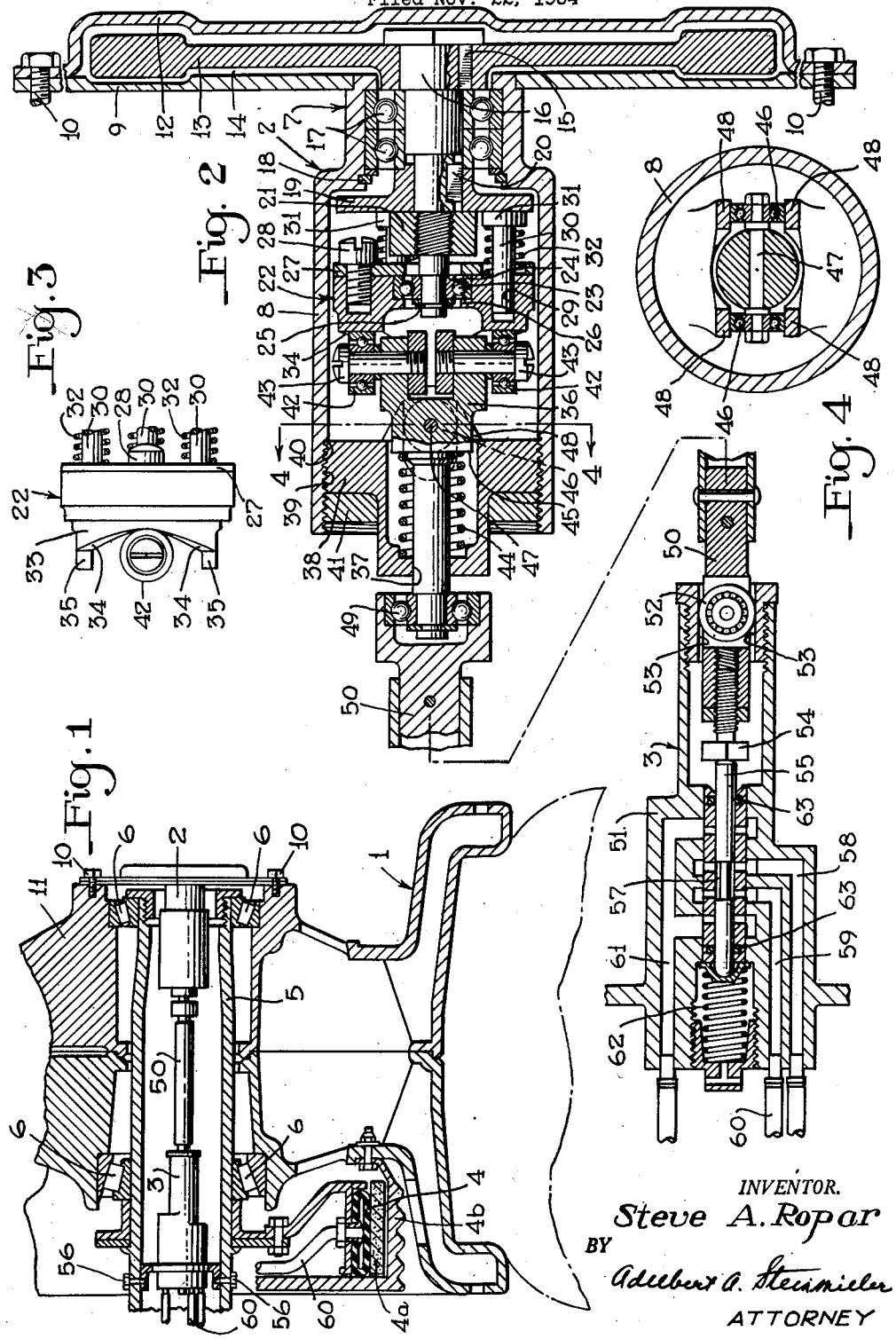
Dec. 31, 1957 — S. A. ROPAR — 2,818,244
DECELERATION RESPONSIVE APPARATUS
Filed Nov. 22, 1954
INVENTOR.
Steve A. Ropar
BY
Adelbert A. Steinmiller
ATTORNEY

# United States Patent Office 2,818,244
Patented Dec. 31, 1957

DECELERATION RESPONSIVE APPARATUS

Steve A. Ropar, Milwaukee, Wis., assignor to Westinghouse Air Brake Company, Wilmerding, Pa., a corporation of Pennsylvania Application November 22, 1954, Serial No. 470,406

4 Claims. (Cl. 264—1)

This invention relates to brake control apparatus of the type using an inertia operated, wheel-slip responsive device for automatically controlling vehicle brakes so as to prevent locking and consequent sliding thereof, and, more particularly, to wheel-slip responsive devices, adaptable to high speed aircraft having small landing wheels and minimum clearance space for movement of retraction landing gear.

The use of inertia operated control devices for automatically controlling brakes to prevent locking and consequent sliding of aircraft wheels is not new. But because of the high rates of speed at which present day airplanes travel, it has become essential to maintain the overall weight of such airplanes at a minimum and to reduce air resistance by streamlining.

Accordingly, the principal object of the invention is the provision of an improved control device of the above type which, for the purpose intended, is of minimum size and weight and of maximum compactness, and which is adapted to be recessed substantially wholly within the landing wheel hub with no part projecting axially of the wheel beyond the plane of the outer and inner side walls of the wheel tire, thereby rendering the device particularly suitable for application to retractable landing gear in that no additional space on the airplane is required for its installation and use, and interference with required movement of the wheels during retraction and extension is avoided.

Other objects and advantages will become apparent from the following more detailed description thereof.

As used hereinafter, the terms "slip" or "slipping condition" will refer to the condition existing when a vehicle wheel decelerates at an excessively rapid rate toward a locked condition as the result of application of a braking force to said wheel exceeding the limit of adhesion of the wheel tread to the ground or road surface. The term "sliding condition" will refer to a dragging of the wheel in a locked condition on the runway or ground.

The invention will be described in connection with one wheel only of an airplane, but it should be understood that each wheel desired to be controlled will be similarly equipped and that the invention, while particularly adapted for, is not necessarily limited to use on airplanes.

In the accompanying drawing, Fig. 1 is an elevational view, partly in section and partly in outline, of a brake control apparatus mounted on the landing wheel of an airplane and embodying a control device constructed in accordance with the invention; Fig. 2 is an elevational view, partly in section and partly in outline, of said control device on a larger scale than Fig. 1; Fig. 3 is a view, in outline, on slightly reduced scale, of one of the component members of said control device as viewed from the top of Fig. 2; and Fig. 4 is a cross-sectional view of said control device taken along line 4—4 of Fig. 2 in the direction of the arrows.

Description

As shown in the drawing, the reference numeral 1 designates an airplane landing wheel adapted to be braked. The brake control apparatus for controlling application and release of braking force to the wheel 1 comprises an inertia-operated wheel-slip responsive device 2 including a release valve device 3 and an expansible and contractable brake tube 4 for operating brake shoes 4a adapted for exerting a braking force on a brake drum 4b. The wheel-slip responsive device 2 and the release valve device 3 are coaxially recessed within, and at opposite ends of, a tubular non-rotative axle 5 on which is rotatively mounted, in conventional manner, the wheel 1 through the medium of bearings 6 at opposite ends of the wheel hub. The non-rotative axle 5 is supported in conventional manner (not shown) on an aircraft oleo strut or other landing gear.

The inertia-operated wheel-slip responsive device 2 comprises a housing 7 including a cylindrical or tubular section 8 and secured to one end thereof in coaxial relation therewith, an annular disc-like portion 9 which is adapted to be removably mounted by suitable means, such as a plurality of bolts 10, to the outer end of the hub portion 11 of the wheel 1 concentrically thereof and for rotation therewith, with the cylindrical section 8 disposed wholly within the axle 5 of the wheel. The housing 7 further comprises a cup-like cover plate 12 mounted against the side of the disc-like portion 9, opposite the cylindrical section 8, and is secured thereto and also to the hub portion 11 by the bolts 10. The overall axial thickness of that portion of the housing 7 formed by the cover plate 12 and the disc-like portion 9 is such that said cover plate does not protrude from the outer face of the wheel hub beyond the clearance limits of said wheel, which, for descriptive purposes, may be called "outboard clearance." Such structure of the housing 7 provides for positive clearance of the fuselage by the wheel-slip responsive device 2 when, in the case of airplanes, the wheels are retracted into the fuselage upon take-off, thereby eliminating possibility of damage to said wheel-slip responsive device which might otherwise result from striking the fuselage upon such retraction of the wheels, and also provides for use of the invention without dimensional changes in a fuselage.

A rotary inertia mass, or flywheel 13, contained in a chamber 14 formed between the disc-like portion 9 and the cover plate 12, is secured by a key 15 to and carried axially by one end of a shaft 16.

The shaft 16 is journaled, intermediate its ends, in ball bearings 17 that are secured by a snap ring 18 in a reduced portion of the cylindrical section 8 of the housing 7 adjacent the disc-like portion 9, with the portion of said shaft carrying said flywheel abutting against one side of one of said bearings. An annular friction, or clutch plate 19 is slidably received on the shaft 16 adjacent to and abutting the bearing 17 opposite the flywheel 13, and is secured on said shaft for rotation therewith by suitable means such as a key 20. A nut 21, screwed onto the inboard end of shaft 16, abuts against the clutch plate 19 and thereby prevents axial play of said shaft, the flywheel 13 and said clutch plate in the bearings 17.

A circular cam member 22 is journaled on the end of the shaft 16 opposite the flywheel 13 by means of a ball bearing 23 secured on said end of said shaft between a shoulder 24 on the shaft engaging one side of the inner race of said bearing and a retaining ring 25 secured to the shaft 16 and engaging the opposite side. The cam member 22 is secured to the outer race of the bearing 23 by an integral annular collar 26 engaging one side thereof and an over-lapping annular plate 27 engaging the opposite side and secured to said cam member by a plurality of screws 28 (only one of which is shown) extending through said plate and screwed into said cam member. With the structure just described, it will be seen that the cam member 22 is held against axial movement relative to the shaft 16, but is capable of rotational movement on the shaft.

A plurality of spaced bores 29, one of which is shown in the drawing, is provided in the cam member 22 adjacent its periphery, around and extending parallel to the axis of said member, each of said bores containing a slidable plunger 30 carrying on its outer end a clutch shoe 31 yieldingly urged in an axial direction into frictional contact with the clutch plate 19 with a force provided by a coil spring 32 encircling said plunger and compressed between said cam member and the shoe 31.

The cam member 22 is provided on the face opposite the clutch shoes 31 and near its outer periphery with two like, axially extending, substantially semi-circular cams 33, the side of one of which is shown in Fig. 3, the other being located diametrically opposite on said cam member. On the ends of these cams 33 are oppositely arranged cam surfaces 34 and two axially extending stops 35 joining the respective peaks of said cam surfaces.

A driving member 36, disposed in the cylindrical casing section 8 in coaxial relation to the shaft 16, is slidably mounted and supported in an axial bore 37 through an annular guide member 38 secured in the end of said casing section opposite said shaft by means of interengaging screw-threads 39 on the outer periphery of said guide member and on the inner periphery of said casing section, the inner face of said guide member making abutting engagement with an annular shoulder 40 formed internally of said casing section. The guide member 38 may be locked in this position by a screw lock ring 41, or any other suitable means. The inner end of the driving member 36 carries two diametrically opposite ball-bearing rollers 42, or cam followers, arranged to turn on an axis perpendicular to the axis of said driving member. Each of the rollers 42, which may be fixed to the driving member 36 by such means as a cap screw 43, is adapted to engage the cam surface 34 on one of the cams 33 of the cam member 22. A spring 44 encircling the driving member 36 constantly biases said driving member toward a right-hand, or normal, position, in which it is shown in the drawing, limited or defined by engagement of the rollers 42 in the lowermost portions or valleys of the respective cam surfaces 34, as shown in Fig. 3, said spring having one end bearing against the closed end of the guide member 38 and the other end bearing against an annular shoulder 45 formed on said driving member. The driving member 36 extends through and beyond the bore 37 in the guide member 38 for a purpose which will hereinafter be disclosed. Although the driving member 36 is thus supported at its one end in the bore 37 of the guide member 38, sufficient clearance is provided in said bore to permit relative axial and rotational movement of said drive member.

A second set of two diametrically opposite ball-bearing rollers 46, best shown in Fig. 4, is carried by the driving member 36, the rotational axes of said rollers being perpendicular to the rotational axes of the rollers 42 and lying in a plane between the rollers 42 and the guide member 38. The rollers 46 may be mounted on and secured at opposite ends of a pin or stud 47 passing diametrically through the driving member 36.

The guide member 38 has extending perpendicularly from its internal face two sets of guides 48, one at either side of the driving member 36 and between which are disposed the rollers 46, respectively, adapted to roll on said guides upon axial movement of the driving member 36, which will be later described.

The end of the driving member 36 extending beyond the exterior of the guide member 38, has journaled thereto in a fixed axial relation, by suitable means such as a ball-bearing 49, one end of an extension rod 50, which extends axially through the axle 5 to engage at its opposite end the release valve device 3 for operation thereof in a manner to be hereinafter described. By being journaled to the driving member 36 in the manner described, the rod 50 may thus be moved axially in the direction of the left hand, as viewed in the drawing, by said driving member, out of a normal position, in which it is shown in the drawing, to a valve operating position, which will be later described, without being rotated by said driving member. The end of rod 50 opposite the end journaled to the driving member 36 extends axially into a casing 51 of the release valve device 3 and is provided at said end with a set of rollers 52, which are adapted to roll on parallel, axially extending bearing surfaces 53 provided internally of said casing, thereby providing for frictionless relative, axial movement between said rod and the casing of the device 3. A bolt 54 having a square head is axially, screw-threadedly adjustable in the end of rod 50 extending into the device 3, the head of said bolt being adapted for engaging one end of an axially disposed slide valve 55 in the valve device 3.

The release valve device 3, which is coaxially contained in the end of the axle 5 opposite the device 2 and is secured to said axle by suitable means such as bolts 56 extending radially through said axle and an L-shaped flange portion of the casing 51, comprises said casing 51 and the coaxially-disposed slide valve 55. The slide valve 55 is provided substantially intermediate its ends with an annular groove 57, which, when said slide valve is in a normal position, in which it is shown in the drawing, establishes communication between a passageway 58, formed in the casing 51 and connected to a source of fluid under pressure (not shown), and a passageway 59 formed in said casing and connected to the brake tube 4 by a flexible conduit 60. Upon axial movement of the valve 55 to a release position, in the direction of the left hand as viewed in the drawing and in a manner to be hereinafter described, the groove 57 is moved out of registry with passageway 58 to disestablish communication between passageways 58 and 59, and establishes communication between passageway 59 and a passageway 61 formed in the casing 51 and leading to atmosphere. Movement of the valve 55 to its release position is yieldingly resisted by a spring 62. Sealing rings 63, having sealing and sliding contact with the valve 55 and situated in the casing 51 substantially adjacent both ends of said slide valve, prevent leakage of fluid under pressure past the ends of said slide valve.

Operation

In operation it will be assumed that the several devices comprising the brake control apparatus are in their respective normal positions, in which they are shown in the drawing, and the airplane is in the process of landing.

Assuming that, in landing, the airplane wheel 1 has just made contact with the runway surface and that the pilot, at touchdown of said wheel or shortly thereafter, has operated a manual control valve device (not shown) to a brake application position, which normally would effect supply of fluid under pressure to the brake tube 4 by way of the release valve device 3, through passageways 58 and 59, for effecting a brake application on said wheel but which application does not occur at this time, as will be presently explained. The wheel 1 will immediately begin to accelerate to ground speed of the airplane, as will the housing 7 of the wheel-slip responsive device 2, which is mounted on the wheel. The driving member 36, through the guide member 38 and the rollers 46, will also be rotated at the same speed as the housing 7. At the instant that the wheel 1, the housing 7, the guide member 38 and the driving member 36 commence to rotate, the flywheel 13, the clutch plate 19 and the cam member 22 are at a standstill and will tend to remain so due to their static inertia and the absence of solid driving connection between them and driving member 36. Therefore, upon initial rotation of the driving member 36, as above described, the rollers 42 of the driving member 36 will ride up the cam surfaces 34 of the cams 33 until said rollers engage the stops 35, whereby a solid driving connection between the member 36 and the cam member 22 is effected.

As the rollers 42 ride up the cam surfaces 34 of the cams 33, the driving member 36 will be moved axially in the direction of the left hand, as viewed in the drawing, against the opposing force of the spring 44, which will be compressed by such movement. Upon such axial movement of the driving member 36, the guide member 38 will continue to rotatively drive said driving member through the rollers 46, which, by rolling between the guides 48, provide for pratically frictionless, relative axial movement between said driving member and said guide member.

Axial movement of the driving member 36 in the direction of the left hand, as viewed in the drawing, produces a corresponding movement of the extension rod 50, which, in turn, operates the valve 55 to its release position, in which the brake tube 4 will be vented to atmosphere by way of conduit 60 and passageways 59 and 61. This initial operation, as just described, of the wheel-slip responsive device 2 and the release valve device 3, immediately following touch down of the landing wheel 1, is practically instantaneous, so that notwithstanding that the pilot has operated the manual control valve device to a brake application position, any brake application is immediately frustrated by the instant venting of the brake tube 4 to atmosphere.

During this initial operation of the wheel-slip responsive device 2, the driving member 36, driven by the guide member 38, will continue to drive the cam member 22. As previously noted, however, the flywheel 13 and the clutch plate 19, which are at a standstill when the landing wheel makes initial contact with the ground, will not begin to rotate immediately in synchronization with the landing wheel 1 and the housing 7 of the wheel-slip responsive device 2 because of the limited frictional force exerted by the clutch shoes 31 on the clutch plate 19. Enough frictional force, however, is exerted by the clutch shoes 31 on the clutch plate 19 to commence rotating the flywheel 13, after the rollers 42 have engaged the stops 35, that said flywheel will gather sufficient momentum to accelerate up to the rotational speed of the landing wheel 1 and the housing 7. With the flywheel 13 rotating at the same speed as the landing wheel 1, less torque will be required to keep said flywheel rotating at said speed with the result that the spring 44 will bias the driving member 36 and the rod 50 to their normal positions and, consequently, the rollers 42 to their lowermost position on the cams 33, as shown in Fig. 3, and upon such movement of the extension rod 50, the valve 55 will be biased to its normal position by the spring 62. Movement of the valve 55 to its normal position will prevent further venting of conduit 60 and the brake tube 4 through passageway 61, so that, having assumed that the pilot has operated the manual control valve device to a brake application position, the brakes of the landing wheel will automatically be applied by fluid pressure supplied through passageways 58 and 59 and conduit 60 to the brake tube 4.

Let it now be assumed that, with the brakes applied to the landing wheel 1, said wheel runs into an uneven or slippery condition on the runway where the limit of adhesion of said wheel on said runway is insufficient to keep said wheel rolling against the retarding action of the braking force. As a result, the wheel 1 will begin to slip and thereby cause a deceleration of the housing 7 of the wheel-slip responsive device 2 and the driving member 36 relative to the flywheel 13. The flywheel 13, in overrunning the driving member 36, will carry with it the cam member by the virtue of the frictional force exerted by the clutch shoes 31 on the clutch plate 19. As the cam member 22 overruns the driving member 36, the rollers 42 will again ride up the cam surfaces 34 of cams 33 until they are engaged by the stops 35, at which point the clutch shoes 31 will slip on the clutch plate 19 to produce a retarding action thereon, as well as on the flywheel 13.

When the rollers 42 ride up the cam surfaces 34 of cams 33, operation of the valve 55 to its release position is again effected for releasing the brakes on the landing wheel 1, as above described, thereby allowing said wheel to accelerate back to ground speed of the vehicle. It should be noted, however, that, in regaining ground speed, the landing wheel may again overrun the flywheel 13, which has been retarded or decelerated by the action of the clutch shoes 31 on the clutch plate 19. If this occurs, the rollers 42 on the driving member 36 will roll up the opposite cam surfaces 34 of the cams 33, as previously described in connection with touch down of the landing wheel, to maintain the valve 55 in its release position and thereby insure that the brakes on said wheel will not be reapplied until said wheel has positively accelerated up to ground speed of the airplane and said flywheel is rotating in synchronization therewith, at which point the valve 55 will be biased to its normal position and brake reapplication effected, as above described.

If the landing wheel 1 again starts to slip before the airplane comes to a stop, the brakes thereon will again be released and, upon cessation of said wheel-slip, reapplied in the same manner as above described, until eventually the airplane comes to a stop, it being noted that actual locking and sliding of the wheel 1 is positively prevented during stopping of the airplane.

*Summary*

From the foregoing description it should be apparent that I have provided an improved, relatively small, compact and light weight inertia operated brake control apparatus for automatically controlling the release and reapplication of brakes on a vehicle wheel to prevent sliding thereof, said control apparatus having its several component devices mounted on the wheel but disposed wholly within a non-rotative axle of the wheel so as to be well within the clearance limits of the wheel.

Having now described the invention, what I claim as new and desire to secure by Letters Patent, is:

1. An inertia operated control apparatus for association with a vehicle wheel, comprising a housing having one portion adapted for disposititon within said wheel and an enlarged annular portion at one end enclosing an annular chamber and secured to a side of said wheel for rotating said housing with said wheel, a flywheel disposed to rotate within said chamber, a shaft journaled in an end of said one portion adjacent said enlarged portion and extending in one direction into said chamber and therein carrying said flywheel for rotation therewith and extending in the opposite direction into another chamber in said one portion, a friction plate in said other chamber secured to said shaft for rotation therewith, an axially movable actuating element slidably mounted in the opposite end of said one portion in coaxial relation with said shaft, said one portion comprising cooperating guide means for rotatively driving said element and at the same time permitting axial movement thereof relative to said housing, a cam member in said other chamber journaled on said shaft and having on an end face adjacent said element a cam surface, a cam follower carried by said element engaging said cam surface and operative upon rotational movement of said element relative to said cam member to effect axial movement of said element relative to said housing, spring means acting on said element urging said follower against said cam surface, friction driving means carried by said cam member and engaging said friction plate, and spring means acting on said friction driving means urging same against said friction plate for transmitting turning force to said flywheel from said cam means through said friction plate.

2. For use in connection with an aircraft wheel assembly of the type having a landing wheel journaled on a non-rotative axle, a control device comprising a casing member having a tubular portion and at one end of said tubular portion a cylindrical portion of relatively larger diameter and relatively shorter axial length than said tubular portion, the larger diameter casing portion being removably securable to the outboard end of the hub of the wheel with the tubular casing portion received entirely within a recess formed in the non-rotative axle, a shaft journaled within the tubular casing portion and extending into the cylindrical portion, a flywheel secured to said shaft and rotatable therewith, a first member secured within the tubular casing portion in axially spaced relation to said shaft, a control member mounted in said first member so as to rotate therewith and at the same time being capable of axial movement within the tubular casing portion, a pair of rollers carried by said control member in diametrically spaced relation for rotation on an axis perpendicular to the axis of rotation of the control member, a cam member journaled on said shaft having cam surfaces engaged by said pair of rollers, means resiliently biasing said control member axially in one direction to effect a driving connection through said rollers between said control member and said cam member, said cam member being capable of limited rotational movement relative to said control member whereby axial movement of the control member in a direction opposite to said one direction is effected responsively to said relative rotational movement between the control member and the cam member, and means providing a driving connection between said cam means and said shaft whereby to cause rotation of said shaft and said flywheel.

3. An inertia operated control device for use in connection with a vehicle wheel and a hollow non-rotative axle upon which said wheel is journaled for rotation, said control device comprising a casing adapted to be separably attached to the outboard face of said wheel for coaxial rotation therewith and having a portion extending into the outer end of said hollow axle, a flywheel journaled for rotation within said casing, a control member coaxially mounted in said casing for rotation therewith and at the same time being capable of axial movement relative thereto, a first pair of spaced rollers carried by said control member and rotatable on an axis perpendicular to the axis of the control member, a pair of guides carried by said casing and engaged by said first pair of rollers to provide a rotative driving connection between the casing and the control member and to accommodate rotation of said first pair of rollers upon axial movement of said control member, a circular cam member mounted for rotation coaxially within said casing and drivingly connected to said flywheel, said cam member having a circular cam surface in perpendicular relation to the axis of rotation of said cam member and having diametrically disposed shallow V-slots formed therein, a second pair of rollers carried by said control member in spaced diametrical relation within the casing for rotation on an axis perpendicular to the axis of rotation of said casing, and resilient means biasing said control member in a direction to effect cooperative engagement of said second pair of rollers in the shallow V-slots of said cam member whereby to provide a driving connection between said casing and said flywheel and whereby to cause axial movement of said control member upon rotative acceleration and deceleration of the casing with said wheel.

4. An inertia operated control device for use in connection with a vehicle wheel and a hollow non-rotative axle upon which said wheel is journaled for rotation, said control device comprising a casing adapted to be separably attached to the outboard face of said wheel for coaxial rotation therewith and having a portion extending into the outer end of said hollow axle, a flywheel journaled for rotation within said casing and having coaxially rotatable therewith a friction clutch plate, a circular cam member mounted for rotation coaxially within said casing, said cam member having a circular cam surface in perpendicular relation to the axis of rotation of said cam member and having diametrically disposed shallow V-slots formed thereon, a plurality of plungers slidably disposed in recesses formed in said cam member at circumferentially spaced intervals, means resiliently biasing said plungers into frictional engagement with said clutch plate for transmitting driving torque therethrough from said cam member to said flywheel, said plungers being effective for permitting angular displacement between said cam member and said clutch plate upon overrunning or lagging of said flywheel relative to said casing, a control member coaxially mounted in said casing for rotation therewith and at the same time being capable of axial movement relative thereto, a first pair of spaced rollers carried by said control member and rotatable on an axis perpendicular to the axis of rotation of the control member, a pair of guides carried by said casing and engaged by said first pair of rollers to provide a rotative driving connection between the casing and the control member and to accommodate rotation of said first pair of rollers upon axial movement of said control member, a second pair of rollers carried by said control member in spaced diametrical relation within the casing and rotatable on an axis perpendicular to the axis of rotation of the cam member for respective engagement in the shallow V-slots in said cam surface, resilient means biasing said control member to effect cooperative engagement of said second pair of rollers in the shallow V-slots of said cam member whereby to provide a driving connection between said control member and said cam member, said resilient means being yieldable to permit axial movement of said control member responsively to rotational movement of said cam member relative to the control member due to inertia effect of said flywheel upon acceleration or deceleration of said wheel.

References Cited in the file of this patent

UNITED STATES PATENTS

| 2,163,731 | Hallot | June 27, 1939 |
| 2,573,387 | Bush | Oct. 30, 1951 |
| 2,631,696 | Yarber | Mar. 17, 1953 |
| 2,698,021 | Bricker et al. | Dec. 28, 1954 |
| 2,744,699 | Lucien | May 8, 1956 |